July 3, 1956   W. H. COX ET AL   2,753,544
SEISMIC DETECTOR
Filed Oct. 27, 1953

INVENTORS
WILLIAM H. COX &
JOHN W. MILLINGTON
BY
Busser, Smith & Harding
ATTORNEYS United States Patent Office 2,753,544
Patented July 3, 1956

2,753,544

SEISMIC DETECTOR

William H. Cox, Orange, and John W. Millington, Beaumont, Tex., assignors to Sun Oil Company, Philadelphia, Pa., a corporation of New Jersey Application October 27, 1953, Serial No. 388,587

4 Claims. (Cl. 340—17)

This invention relates to a seismic detector and, more particularly, to a detector having low frequency response.

The detector represents an improvement in the type of detector disclosed in the patent to R. L. Henson No. 2,533,249, issued December 12, 1950.

In certain seismic operations, such as refraction shooting or where wide band recording is required, it is not only desirable to have a detector which is highly sensitive to vibrations passing through the earth, but it is also desirable that the detector be relatively more sensitive to low frequency vibrations than are detectors more commonly used for reflection shooting.

In accordance with the present invention, there is provided a seismic detector having a high degree of sensitivity to low frequencies and in which a movable mass is mounted on a pair of flat suspension elements having non-radial spring arms which are assembled within the detector in such a manner as to be in opposed torsionally preloaded relation to each other. The result of this arrangement is to provide a form of toggle action in the suspension elements in which normal at rest positions of the suspension elements exist on one side or the other of a neutral position. A supplementary suspension means is provided in order to retain the suspended mass in the neutral position and to give rise to a resultant small positive spring constant. The combination of the spring characteristics of the preloaded suspension elements and the supplementary suspension means produces a resultant characteristic which is substantially linear through its useful range. Thus, a detector is provided which has a low resonant frequency.

The accomplishment of these results as well as other objects of the invention particularly relating to details of construction will become apparent from the following description when read in conjunction with the accompanying drawings, in which.

Figure 1:
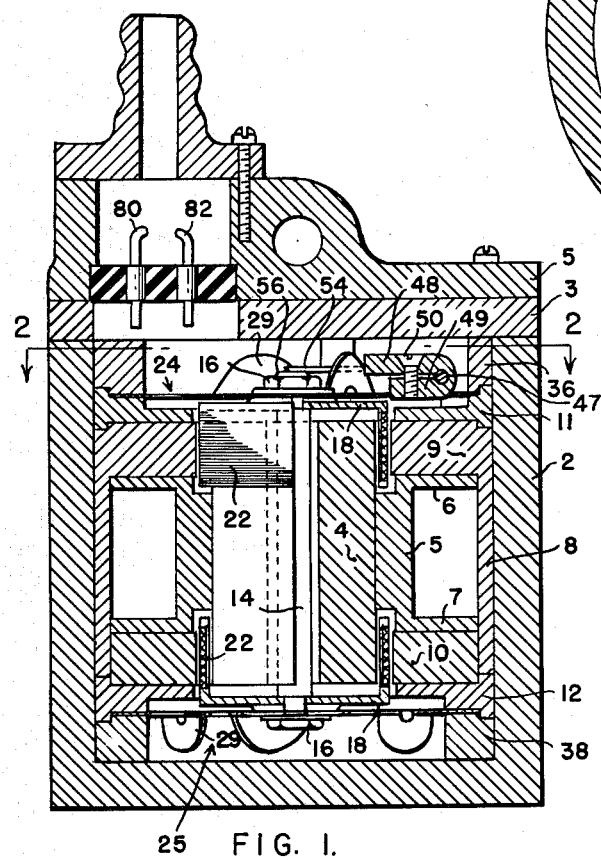
Figure 1 is a vertical axial section through a typical detector provided in accordance with the present invention.

Referring to Figure 1, there is shown a seismic detector including a cylindrical housing 2 of non-magnetic material. Within the housing there is located a powerful permanent magnet in the form of a cylinder 4 which may be of Alnico, or the like. The magnet 4 is mounted within a non-magnetic annular member 5 having radially outwardly extending flanges 6 and 7. The member 5 is mounted within an annular member 8 with its radially extending flange 6 in engagement with an inwardly extending radial flange 9 of the annular member 8. A ring 10 is fitted within the annular member 8 and is in engagement with the radially extending flange 7 of the member 5. The inner faces of the flange 9 and the ring 10 terminate adjacent to but spaced from the magnet 4. The annular member 8, its inwardly extending flange 9 and the ring 10 are formed of magnetic material and thus a magnetic path is provided from the magnet 4 across an air gap to the inner surface of the flange 9, through the annular member 8, the ring 10 and the air gap between the ring 10 and magnet 4 to the magnet 4.

Figure 2:
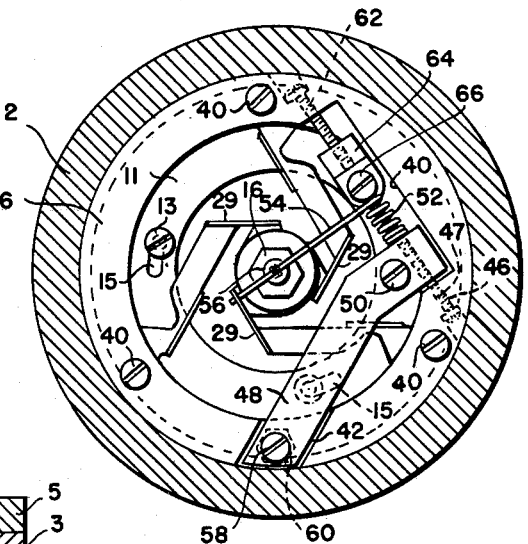
Figure 2 is a transverse section taken on the plane indicated at 2—2 in Figure 1.

The assembly providing the magnetic circuit is clamped between the top ring 11 and the bottom ring 12 which are bolted to the adjacent parts 9 and 10 by bolts as indicated at 13 in Figure 2.

Figure 3:
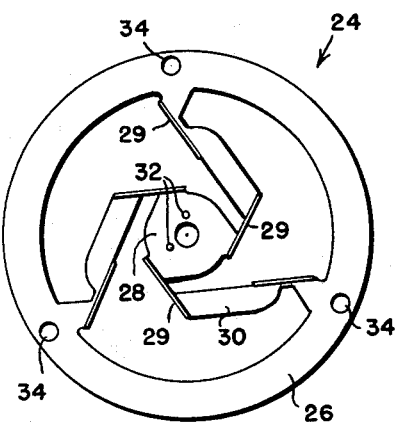
Figure 3 is a plan view of one of the suspension springs employed in the detector shown in Figure 1.

The suspended assembly within the housing 2 includes a rod 14 of non-magnetic material to the ends of which are clamped by nuts 16 a pair of coil forms 18 having flanges extending through the air gaps in the magnetic circuit and arranged to support pick-up coils 22. The nuts 16 and the coil forms 18 and their flanges are of non-magnetic material. In particular, the coil forms are formed of anodized and, therefore, surface insulated aluminum alloy. At each of its ends the suspended assembly is resiliently mounted by means of flat spring arrangements as indicated at 24 and 25. A spring 24 is shown in plan view in Figure 3. Springs 24 and 25 are identical.

Each of the supporting springs includes an annular ring 26 provided with a plurality of non-radially arranged inwardly extending spring arms 30 which support a central portion 28 which is adapted to be clamped to the moving assembly by one of the nuts 16. The central portion 28 is provided with a pair of bores 32 through which there extend a pair of pins which pass through the coil forms 18 and into the central rod 14. Each of the arms 30 is provided with upturned portions 29. These upturned portions or flanges lie in a plane substantially perpendicular to the plane of the flat spring arrangement.

Rings 36 and 38 are positioned adjacent to the top and bottom rings 11 and 12, respectively. A flat spring arrangement 24 is mounted between the adjacent pair of rings 36 and 11 and a flat spring arrangement 25 is mounted between the adjacent pair of rings 12 and 38. Rings 36 and 38 are provided with bores in alignment with the bores 34 in the annular rings 26 of the flat spring arrangements through which suitable screws are passed for clamping the flat spring arrangements in position on the rings 11 and 12, respectively.

The detector assembly, which is positioned within the housing 2, is held in place by means of a spacer plate 3, which is positioned under a cover plate 5 bolted over the top of the housing 2.

The inner surface of the ring 36 is provided with a cut-out portion 40. The upper surface of the ring 36 is provided with a transversely extending slot 42. A bore 46 extends on a chord line through the ring 36 and in alignment with the cut-out 40. A screw 47 is passed in sliding fit relation within the bore 46 and through a bore at the radius point of a backwardly bent portion 49 of the end of member 48 and is clamped therein by means of a clamping screw 50 which serves to draw the backwardly bent portion 49 and the member 48 together. Attached to the end of the screw 47 is a coil spring 52 having an end portion 54 extending radially inwardly across the upper end of the central pin 14 of the movable element. The portion 54 of the spring is adapted to be soldered or otherwise suitably connected to the upper end 56 of the rod 14. The spring 52 is preferably formed of a suitable flexible material such as beryllium copper and serves to provide an upward force upon the suspended mass. The member 48 is mounted on the upper ring 36 in the grooved portion 42 thereof by means of a screw 58. The elevation of the end of the member 48 within the slot 42 in the ring 36 may be adjusted by adjusting the height of the head of the screw 58 by turning the screw into or out of the ring 36 and thereafter locking the screw in position and locking the member 48 on the screw by means of suitable locking nuts 60.

It will be evident that the lifting force applied by the spring 52 to the suspended assembly may be adjusted by turning the screw 47 and then clamping the screw in position by means of the clamping screw 50. A relatively fine spring tension adjustment is provided by the adjusting screw 58 by means of which the end of the member 48 may be raised and lowered causing the member to rotate around the axis of the screw 47.

A second screw 62 passes through a second bore extending along a chord line in the ring 36 and into the cut-out portion 40 thereof and is adapted to be threaded into a block 64 which is attached to the upper surface of the ring 11 by means of a screw 66.

As previously noted, the ring 11, to which the flat spring member 24 is clamped by the ring 36, is attached to the member 9 by means of screws 13 which pass through elongated holes 15 in the clamping ring 11. As the screw 62 is threaded into the block 64, clamping ring 11 is caused to rotate in a counterclockwise direction, as viewed in Figure 2, against the resistance of the spring members 24 and 25 and, when the desired degree of rotation has been obtained, the screws 13 may be tightened, clamping the ring 11 in fixed position against the member 9. It will be evident that this setting will result in a displacement of the annular portion 26 of the spring member 24 with respect to the central portion 28 thereof and a similar displacement of the inner and outer portions of the lower spring member 25, the loading being transmitted through the central rod 14 of the movable mass and the pins in the bores 32.

The springs 24 and 25 are so mounted that, when the outer portion 26 of the spring 24 is rotated in a clockwise direction with respect to the inner portion thereof and the inner portion 28 of the spring member 25 is therefore urged in a clockwise direction with respect to the outer portion thereof, the arms 30 of both members are subjected to compression which is relieved by displacement of the portions 28 of the spring members either upwardly or downwardly out of the planes of their outer portions 26. A toggle action thus results and a force is required to move each of the members 28 toward the plane of its associated annular member 26 from either side thereof. The upturned portions 29 of the arms 30 serve to increase the range of movement over which the toggle action takes place, and further to make the toggle action of the spring members less susceptible to temperature changes.

Figure 4:
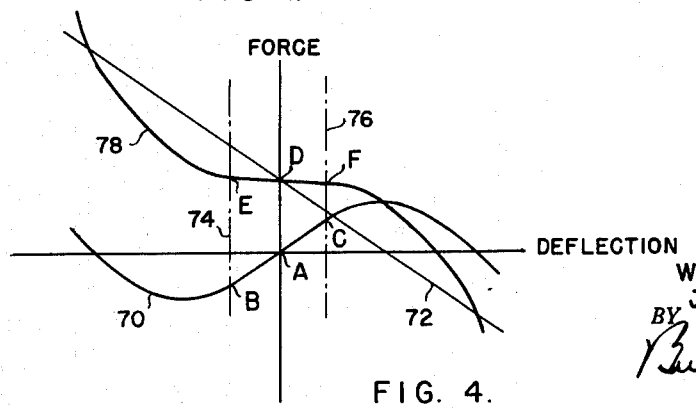
Figure 4 is a graph showing force-deflection curves for the suspension springs employed in the detector shown in Figure 1.

The combination of springs 24 and 25 when they are related as just mentioned has a characteristic as indicated in Figure 4 by the curve 70. This characteristic involves a zero force when the deflection is zero as indicated at A and is substantially linear through the portion BC between deflection limits such as are indicated by the lines 74 and 76. In this substantially linear region the spring combination therefore acts as a spring having a negative spring constant represented by the slope of the portion BC of the characteristic. It may be noted that in Figure 4 the "force" indicated is that exerted by the spring combination on the suspended mass.

In the zero-deflection position, where the flat springs exert no force, the suspended mass is supported by the coil spring which has a substantially linear characteristic as indicated at 72, its spring constant being positive as represented by the slope of the line 72. The force at point D where the characteristic intersects the zero deflection axis corresponds to the weight of the suspended mass. Combined action of both the flat springs and the coil spring produces an overall characteristic which is indicated at 78 and which between points E and F, corresponding to the useful range region 74—76, is substantially linear and provides a small positive spring constant as indicated by the slope of the portion EF of the characteristic. In view of this small spring constant, the detector may be caused to have a low resonant frequency of the order, for example, of 6.5 cycles per second.

The detector assembly is provided with enclosed terminals 80 and 82 which are adapted to be connected to flexible leads, not shown, extending from the detector coils 22 and provide for external electrical connection to the detector. The coils 22 are so wound and connected that stray magnetic fields produce bucking electromotive forces in the coils, whereas the magnetic field of the detector itself produces additive electromagnetic forces in the coils. Thus the noise produced by stray magnetic fields is minimized.

It will be evident that various modifications may be made to the embodiment of the invention described herein without departing from the scope of the invention as set forth in the following claims.

What is claimed is:

1. A seismic detector comprising relatively movable elements providing an output signal due to their relative motion, means for resiliently mounting one of said elements on the other element, said mounting means including spring means having a positive spring constant and spring means having a negative spring constant, the last mentioned means comprising a pair of spring elements each giving rise to a rotational force upon spring deflection and being mounted in opposed rotationally preloaded relation, means for adjusting the tension on the positive spring constant spring, and means for adjusting the rotational preloading on the opposed rotationally preloaded spring elements.

2. A seismic detector having a low resonant frequency comprising relatively movable elements providing an output signal due to their relative motion and means for resiliently mounting one of said elements on the other element, said mounting means including means having a positive spring constant and means having a negative spring constant, said positive spring constant means supporting the mounted element in a neutral position and the combined action of the last two means providing mounting means having small positive spring constant, said means having a negative spring constant comprising a pair of flat spring members each having annular outer portions rigidly connected through one of said relatively movable members, inner portions rigidly connected through the other of said relatively movable members and non-radially arranged spring arms extending between the inner and outer portions, the inner and outer portions of each of said flat spring members being in torsionally displaced relation and one of said pair of flat spring members being in opposed torsionally displaced relation with respect to the other of said flat spring members, the inner and outer portions of said flat spring members lying in parallel plane alignment and said arms each having a portion of their length formed on a plane substantially perpendicular to the planes of the inner and outer spring portions.

3. A seismic detector having a low resonant frequency comprising relatively movable elements providing an output signal due to their relative motion and means for resiliently mounting one of said elements on the other element, said mounting means including spring means having a positive spring constant and spring means having a negative spring constant, the last mentioned means comprising a pair of flat spring elements positioned on parallel planes extending radially of the axis of relative motion of said elements and positioning said elements relatively in said radial planes, said flat spring elements having identical spring characteristics mounted in opposed relation under balanced preloading, said positive spring constant means supporting the mounted element in a neutral position along the axis of relative motion of said elements, and the combined action of the last two means providing mounting means having a small positive spring constant.

4. A seismic detector having a low resonant frequency comprising relatively movable elements providing an output signal due to their relative motion and means for resiliently mounting one of said elements on the other element, said mounting means including means having a positive spring constant and means having a negative spring constant, said positive spring constant means supporting the mounted element in a neutral position and the combined action of the last two means providing mounting means having a small positive spring constant, said means having a negative spring constant comprising a pair of flat spring members each having annular outer portions rigidly connected through one of said relatively movable members, inner portions rigidly connected through the other of said relatively movable members and non-radially arranged spring arms extending between the inner and outer portions, the non-radially arranged spring arms of one of the flat spring members being in generally opposed relation to the non-radially arranged spring arms of the other of the flat spring members.

References Cited in the file of this patent

UNITED STATES PATENTS

| | | |
|---|---|---|
| 2,067,803 | Thearle | Jan. 12, 1937 |
| 2,313,893 | Rushing | Mar. 16, 1943 |
| 2,562,983 | Clewell | Aug. 7, 1951 |
| 2,591,795 | Eisler | Apr. 8, 1952 |
| 2,636,160 | Loper et al. | Apr. 21, 1953 |